Dec. 23, 1958 S. A. STERNBERGH 2,865,388
LIQUID MIXING AND PROPORTIONING DEVICE
Filed Jan. 13, 1955 2 Sheets-Sheet 1

INVENTOR.
Solon A. Sternbergh,
BY
Paul & Paul
ATTORNEYS.

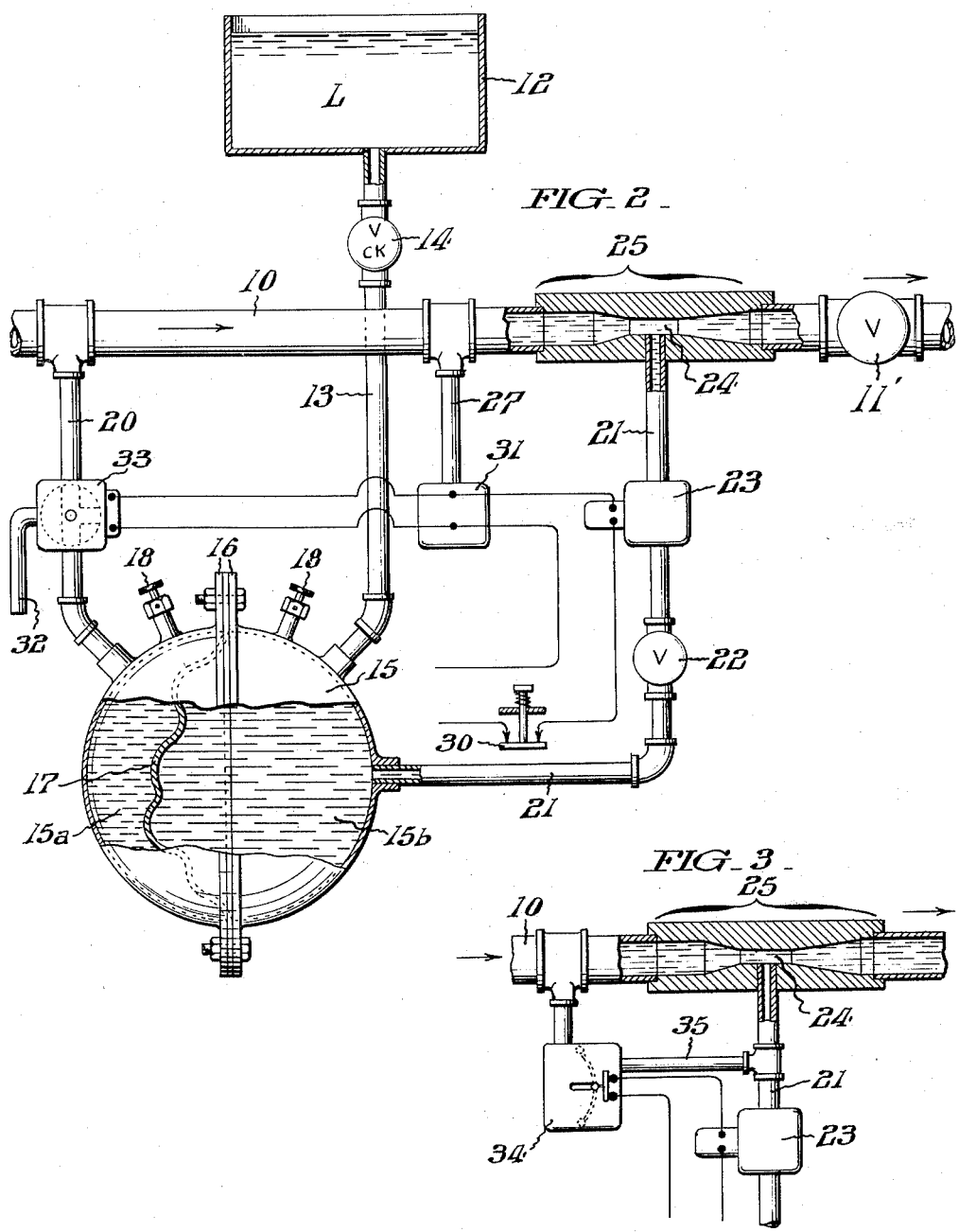

United States Patent Office 2,865,388
Patented Dec. 23, 1958

2,865,388

LIQUID MIXING AND PROPORTIONING DEVICE

Solon A. Sternbergh, West Lawn, Pa., assignor to West Shore Manufacturing Company, Reading, Pa., a corporation of Pennsylvania Application January 13, 1955, Serial No. 481,639

6 Claims. (Cl. 137—101.17)

This invention relates to a device for mixing and proportioning two different liquids, and further concerns an automatic device for incorporating a liquid additive into a flowing liquid.

It is an object of this invention to provide a completely automatic apparatus for mixing liquid additive into a flowing carrier liquid, which apparatus automatically supplies a fixed proportion of the liquid additive with respect to the carrier liquid even when the rate of flow of carrier liquid is increased or decreased. Another object is to provide a device of this character which operates efficiently even though the flow of carrier liquid is intermittent.

Although liquid proportioning pumps of various types are now available, they have many moving parts and are quite expensive and require considerable maintenance. It is accordingly another object of this invention to provide a liquid proportioning means which is relatively inexpensive, which has relatively few moving parts, and which is extremely inexpensive to maintain.

Other objects and advantages of this invention, including the ease with which it may be applied to existing equipment, will further become apparent hereinafter, and in the drawings, whereof:

Fig. 2 represents a view similar to Fig. 1, showing a modified form of the invention; and Fig. 3 represents a partial view showing another modification.

Figure 1:
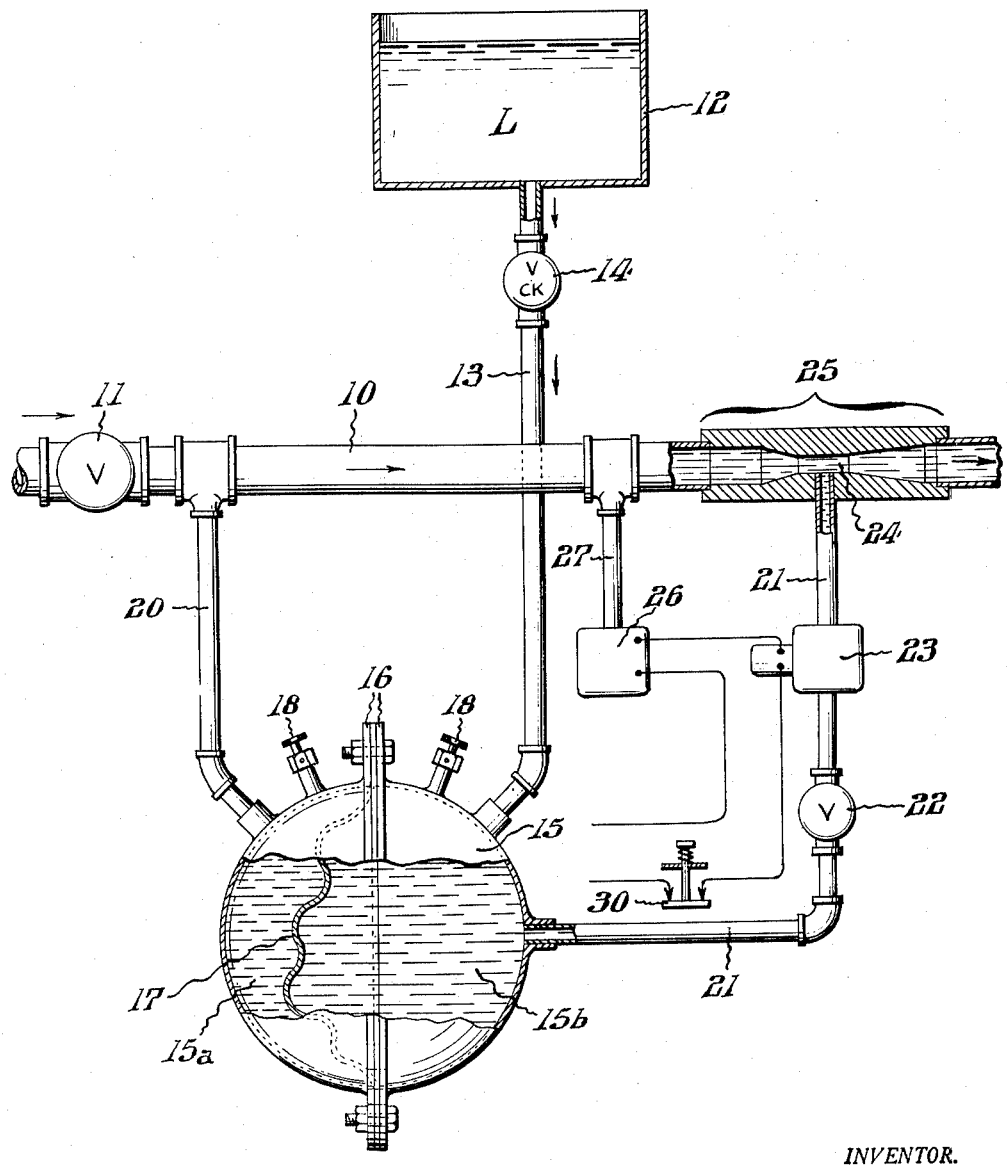
Fig. 1 represents a view in side elevation of one specific form of liquid proportioning apparatus in accordance with this invention, certain of the parts being broken away and shown in section in order more particularly to illustrate important details.

Turning now to the specific embodiment of the invention selected for illustration in Fig. 1 of the drawings, the number 10 designates a main pipe in which water or any other carrier liquid may flow. It may be assumed that the carrier liquid flows in the direction indicated by the arrows in the drawing. A valve 11 is provided in the pipe 10 to control the flow of said carrier liquid.

A storage tank 12 is provided for the liquid additive L. The tank 12 is located above the level of the pipe 10. A delivery pipe 13 having a check valve 14 conducts the liquid L downwardly from the tank 12 into a closed container 15. As shown in the drawing, the container 15 is substantially spherical and consists of two halves having flanges 16 which are bolted together. A flexible diaphragm 17 is sealed between the flanges 16 and separates into two sections the space within container 15. The diaphragm 17 is normally of a semi-spherical shape but it has sufficient flexibility that it may readily be shifted from one section 15a of the container 15 to the other section 15b thereof. Air bleeds 18 are provided in the respective sections 15a, 15b.

A pipe 20 connects the pipe 10 into the section 15a of the container 15. The pipe 13 is connected into the section 15b of the container 15. A pipe 21 extends from the section 15b through a flow controlling valve 22 (preferably a needle valve) and through a solenoid valve 23 into the throat 24 of a venturi 25 which is connected in the pipe 10 in such manner that the fluid flowing in the pipe 10 flows through the venturi 25.

The number 26 designates a pressure switch which is electrically connected to operate the solenoid valve 23, and which communicates with the pipe 10 through a pressure transmission pipe 27. The number 30 designates a manually operable electric switch for opening the solenoid valve 23 independently of the pressure switch 26.

The operation of the apparatus will readily be apparent. Assuming no fluid is flowing through the pipe 10, and that the solenoid valve 23 is closed, the liquid L drains from the tank 12 into the portion 15b of container 15, thereby shifting the diaphragm 17 toward the left as illustrated in the drawing. This forces water or other carrier fluid out of the section 15a and upwardly through the pipe 20. When the valve 11 is opened, causing carrier fluid to flow in the pipe 10, the pressure of the carrier fluid immediately acts upon the pressure switch 26, throwing open the solenoid valve 23. In view of the pressure drop caused by the venturi, the fluid pressure on pipe 20 is greater than the fluid pressure on pipe 21, and this pressure differential forces diaphragm 17 toward the right as viewed in the drawing, forcing liquid L out of the container portion 15b through the needle valve 22 and into the throat of venturi 25. The introduction of the additive liquid L into the venturi throat results in rapid dispersion of the additive in the carrier. Should the rate of flow of carrier liquid in the pipe 10 be increased, the pressure differential between the pipes 20, 21 correspondingly and proportionately increases, and the rate of flow of additive liquid L through the pipe 21 proportionately increases.

Accordingly, it will be appreciated that the rate of flow of the additive liquid L in pipe 21 is increased or decreased in proportion with increased or decreased flow of carrier liquid in the pipe 10.

Should the valve 11 again be closed, the solenoid valve 23 is automatically closed and the liquid L drains from the tank 12, refilling the container section 15b with additive.

Accordingly, it will be apparent that the proportioning device of this invention is completely automatic. It not only maintains proper proportions automatically, but the container 15b also fills itself automatically each time the carrier fluid flow is stopped, without allowing the carrier fluid to mix with the additive. For those and other reasons, the apparatus of this invention has proved valuable in connection with a wide variety of applications where it is desired to mix small proportions of liquid additive with a relatively large proportion of carrier liquid. For example, in automatic domestic washing machines, liquid detergent, starch or other additives may inexpensively and automatically be "metered" into the incoming water, notwithstanding the fact that the water flow is controlled by a timer in accordance with an intermittent cycle. Other applications and uses of this invention will readily become apparent.

The switch 30 provides a means for interrupting the mixing of the additive with the carrier liquid. In order to prevent mixing, the switch 30 is opened. Its opening and closing operation may be regulated manually or by a timing device where it is desired to interrupt the mixing at irregular or regular intervals.

Referring to Fig. 2, the apparatus is quite similar to that of Fig. 1, and similar parts are similarly numbered. However, the valve 11' is downstream of the venturi 25. When valve 11' is closed, carrier liquid pressure increases in main pipe 10. A modified form of pressure switch, designated by the number 31, is substituted for the switch 26 of Fig. 1. Switch 31, which may be of any suitable and available type, is set to close the solenoid valve 23 when line pressure increases (when valve 11' is closed), and to open solenoid valve 23 when line pressure decreases (when valve 11′ is opened).

It will further be noted that a drain 32 is connected into the pipe 20, and that a three-way solenoid valve 33 is provided at the point of said connection. Valve 33 is electrically connected to pressure switch 31 to open the container portion 15a to drain 32 and close pipe 10 from container portion 15a when the pressure in line 10 increases (valve 11′ is closed), and to close the container portion 15a from drain 32, and to open the pipe 10 to the container portion 15a when the pressure in line 10 decreases (valve 11′ is open).

In the operation of the apparatus of Fig. 2, liquid L automatically fills the container portion 15b while carrier liquid is forced out of drain 32, when valve 11′ is closed and no carrier fluid is flowing in pipe 10.

Referring to Fig. 3, it will be noted that a pressure switch 34 of the differential pressure type is provided. Switch 34, which may be of any suitable and available type, is connected at one side to the pipe 10 upstream of venturi 25 and at the other side by a pipe 35 into the throat of venturi 25. The switch 34 is sufficiently responsive for actuation by the pressure differential provided by the venturi 25, and controls the operation of the solenoid valve 23 without regard to the location of the valve 11 (Fig. 1) or 11′ (Fig. 2).

Although the liquid flowing in the pipe 10 has been referred to herein as a "carrier liquid," and the liquid flowing in the pipe 21 has been referred to as "the liquid additive," it will be appreciated that these expressions are not intended to imply any limitation as to the relative proportions of the respective liquids. Although the apparatus of this invention is often used to add small quantities of liquid additive to relatively large quantities of carrier liquid, the limiting factor of the mixing proportion is the capacity of the venturi tube or equivalent restrictive device in creating a differential pressure.

Although the invention has been described with reference to a specific embodiment thereof, it will be appreciated that various modifications may be made, that equivalent elements may be substituted for those illustrated and described, that parts may be reversed, and that certain features of the invention may be used independently of the use of other features. For example, it may be desirable to eliminate the needle valve 22, using instead a pipe line of proper size to limit the rate of flow of additive. Other parts of the apparatus may similarly be eliminated, provided the remaining arrangement and combination of parts is within the spirit and scope of the invention as defined in the appended claims.

Having thus described my invention, I claim:

1. Apparatus for introducing an additive liquid into a carrier liquid, comprising a main pipe in which said carrier liquid is caused to flow; a venturi positioned in said main pipe; a container having an internal flexible diaphragm dividing the container into two separate portions, a carrier liquid portion and an additive liquid portion; a second pipe connecting said carrier liquid portion to the main pipe upstream of the venturi; a third pipe connecting said additive liquid portion of the container to the throat of the venturi, closure means operatively positioned in said third pipe; control means for operating said closure means directly in response to the flow of carrier liquid in the main pipe and independently of the flow of liquid additive, said control means being connected to the main pipe by mechanical means and being connected to said closure means by electrical means; a reservoir containing said additive liquid; a fourth pipe connecting the reservoir to said additive liquid portion of the container; and refilling means for automatically refilling said additive liquid portion of the container, said refilling means including check means operatively positioned in the fourth pipe for allowing passage of additive liquid to said additive liquid portion of the container and for preventing flow of additive liquid in the reverse direction, and means for relieving the pressure in said second pipe and said carrier liquid portion of the container, whereby said additive liquid is automatically caused to flow from the reservoir into said additive liquid portion of the container to refill it.

2. Apparatus for introducing liquid additive into a carrier liquid comprising a main pipe in which said carrier liquid is caused to flow, a venturi in said main pipe, a container having an internal flexible diaphragm dividing said container into two separate portions, a second pipe connecting one of said portions to said main pipe upstream of said venturi, a reservoir containing said liquid additive, means connecting the reservoir to the other of said container portions, check means preventing flow of liquid additive from said other portion to said reservoir, additive delivery means connecting said other container portion to the throat of said venturi, closure means in said additive delivery means, control means for operating said additive closure means directly in response to carrier liquid flow in said main pipe and independently of the flow of said liquid additive, means mechanically connecting said pipe and said control means, means electrically connecting said control means and said additive closure means, a drain operatively connected to said second pipe, valve means operatively connected between said drain and said second pipe for closing off the fluid communication between said main pipe and said container and for opening said container to said drain when no carrier liquid is flowing in said main pipe and said additive closure means is closed, whereby said container is automatically refilled with liquid additive.

3. The apparatus defined in claim 2, wherein is provided a second control means connected electrically to the additive closure means for operating said additive closure means independently of the carrier liquid flow in the main pipe.

4. The apparatus defined in claim 2, wherein is provided flow controlling means for regulating the rate of flow of the additive in said additive conductor means.

5. The apparatus defined in claim 2, wherein said reservoir is positioned above the main pipe.

6. Apparatus for introducing an additive liquid into a carrier liquid, comprising a main pipe in which said carrier liquid is caused to flow, a venturi in said main pipe, a substantially spherical container having an internal flexible diaphragm dividing said container into two separate portions, a second pipe connecting one of said portions to said main pipe upstream of said venturi, means forming a reservoir containing said liquid additive, means connecting the reservoir to the other of said container portions, check means preventing flow of liquid additive from said other portion to said reservoir, additive conductor means connecting said other container portion to the throat of said venturi, closure means in said additive delivery means, control means for operating said additive closure means directly in response to carrier liquid flow in said main pipe and independently of the flow of said liquid additive, means mechanically connecting said pipe and said control means, means electrically connecting said control means and said additive closure means, second control means connected electrically to the additive closure means for operating said additive closure means independently of the carrier liquid flow in said main pipe, flow controlling means in said additive conductor means for regulating the rate of flow of said additive, a drain operatively connected to said second pipe, and valve means operatively connected between said drain and said second pipe for closing off the fluid communication between said main pipe and said container and for opening said container to said drain when no carrier liquid is flowing in the main pipe.

(References on following page)

References Cited in the file of this patent

UNITED STATES PATENTS

| | | |
|---|---|---|
| 1,085,348 | Ledoux | Jan. 27, 1914 |
| 1,946,474 | Banks | Feb. 13, 1934 |
| 2,071,095 | Watts | Feb. 16, 1937 |
| 2,203,980 | Burt | June 11, 1940 |
| 2,323,341 | McGill | July 6, 1943 |
| 2,573,299 | Bast | Oct. 30, 1951 |
| 2,590,061 | Ash | Mar. 18, 1952 |